US006498923B2

(12) United States Patent
Ikefuji et al.

(10) Patent No.: US 6,498,923 B2
(45) Date of Patent: *Dec. 24, 2002

(54) TELECOMMUNICATION DEVICE

(75) Inventors: Yoshihiro Ikefuji, Kyoto (JP); Shigemi Chimura, Kyoto (JP); Haruo Taguchi, Kyoto (JP)

(73) Assignee: Rohm Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,989

(22) PCT Filed: Dec. 18, 1997

(86) PCT No.: PCT/JP97/04693

§ 371 (c)(1),
(2), (4) Date: Aug. 24, 1999

(87) PCT Pub. No.: WO98/44649

PCT Pub. Date: Oct. 8, 1998

(65) Prior Publication Data
US 2002/0137463 A1 Sep. 26, 2002

(30) Foreign Application Priority Data
Mar. 28, 1997 (JP) .............................. 9-076922

(51) Int. Cl.[7] .............................. H04B 5/00; H04Q 5/22; G01S 13/08; H03C 1/52
(52) U.S. Cl. .................... 455/41; 455/106; 340/10.1; 340/10.3; 342/51
(58) Field of Search .............................. 455/41, 62, 73, 455/106, 101, 552, 77, 87, 85; 340/10.1–10.4, 854.8, 572.1; 342/42, 51

(56) References Cited

U.S. PATENT DOCUMENTS

| 4,087,753 A | * | 5/1978 | Paul ........................ 325/38 R |
| 4,114,151 A | * | 9/1978 | Denne et al. .......... 343/6.8 LC |
| 4,669,109 A | * | 5/1987 | Le Cheviller et al. ...... 379/143 |
| 5,128,972 A | * | 7/1992 | Horinouchi et al. ........ 375/121 |
| 5,166,676 A | * | 11/1992 | Milheiser ............... 340/825.54 |
| 5,345,231 A | * | 9/1994 | Koo et al. ............. 340/870.31 |
| 5,440,302 A | | 8/1995 | Irmer et al. |
| 5,515,399 A | * | 5/1996 | Swart .......................... 375/258 |
| 5,602,744 A | | 2/1997 | Meek et al. |
| 5,649,295 A | * | 7/1997 | Shober et al. ............ 455/38.2 |
| 5,842,118 A | * | 11/1998 | Wood, Jr. .................. 455/101 |

FOREIGN PATENT DOCUMENTS

| JP | 0007033 | * 1/1991 | ............ H01J/17/00 |
| JP | 4-154223 | 5/1992 | |
| JP | 8-172378 | 7/1996 | |

* cited by examiner

Primary Examiner—Edward F. Urban
Assistant Examiner—Meless N. Zewdu
(74) Attorney, Agent, or Firm—Arent Fox Kintner Plotkin & Kahn

(57) ABSTRACT

A data communication apparatus according to the present invention can be used both in one-wave mode and two-wave mode, and includes: first and second tuning circuits (1, 2); a power supply circuit (3) connected to first tuning circuit (1) for generating power by a signal received by first tuning circuit (1); an information processing circuit (15) connected to first tuning circuit (1) or second tuning circuit (2) through a switching circuit (6) and including a detection circuit (7), a decoder (8), an encoder (10) and the like. Information processing circuit (15) includes a switch control circuit (14) detecting if the mode of the received radio wave is one-wave mode or two-wave mode in accordance with an output from first tuning circuit (1) and controlling switching circuit (6) such that detection circuit (7) is connected to one of first and second tuning circuits (1, 2).

3 Claims, 4 Drawing Sheets

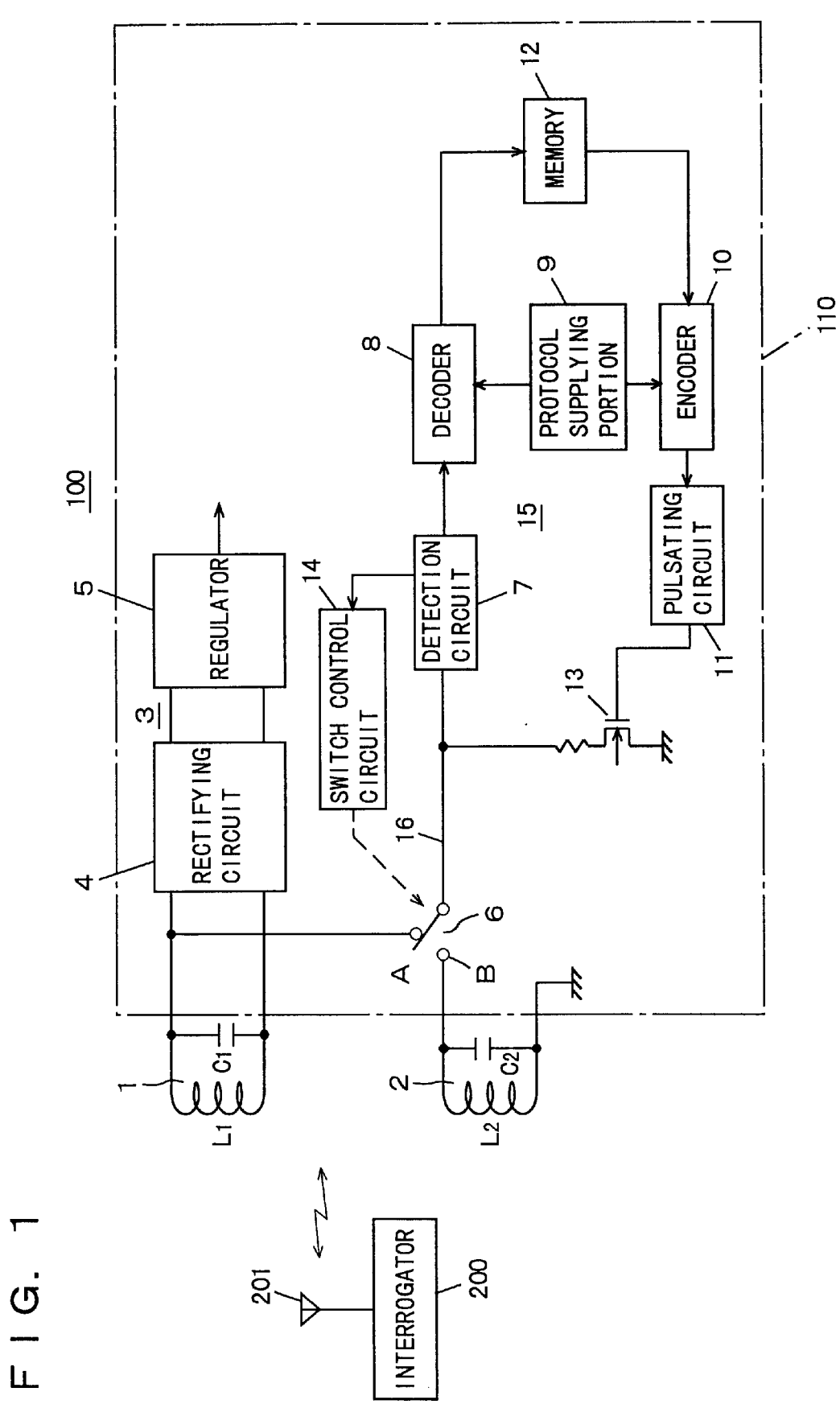
F I G. 1

FIG. 2A  f1
FIG. 2B  f2
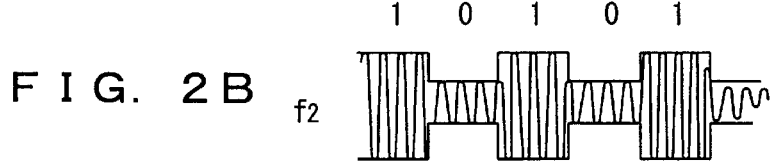
FIG. 3
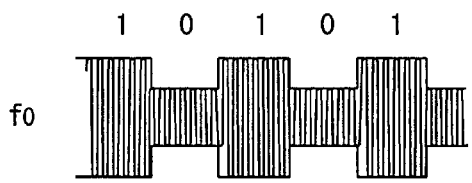
f0
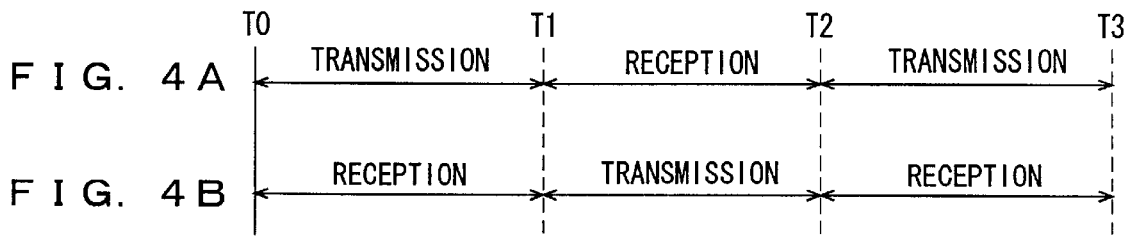
FIG. 4A
FIG. 4B
FIG. 5
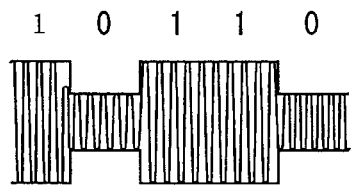

TELECOMMUNICATION DEVICE

TECHNICAL FIELD

The present invention relates to a data communication apparatus which receives a radio wave transmitted from an antenna to generate power for communication.

BACKGROUND ART

Conventionally, a high frequency tag (RF. TAG), which generates power by a radio wave transmitted from an antenna and transmits information which has been stored therein, has been developed and used for a gate of the ski lift, gate at the station, sorting of parcels and the like.

The high frequency tag is provided with a non-volatile memory and a transmission/reception mechanism, but not with a power supply source such as a battery. In addition, power is generated by the received radio wave (a high frequency signal). Thus, the power supply source needs not be provided therein and information exchange can be performed for a long period of time. Further, remote (non-contact) data communication can advantageously be performed as it is performed by the radio wave.

For a system in which such communication apparatus (hereinafter referred to as "a responder") is used, one type of radio wave (one-wave mode) or two types of radio waves (two-wave mode) may be transmitted from the other communication apparatus (hereinafter referred to as "an interrogator"). Only one type of carrier with information is transmitted from the responder in a one-wave mode, so that the carrier is rectified to generate power and also detected to obtain information.

On the other hand, for the responder in a two-wave mode, a first carrier for generation of power which has not been modulated and a second carrier with information are transmitted. Thus, the first and second carriers are separately received, so that the first carrier is rectified to generate power and the second carrier is detected to obtain information.

Since responders used in these modes (e.g., high frequency tags) are of course different in structure, the responder used in one mode cannot be used in the other mode. Therefore, two types of responders are required to perform communication in both modes. Accordingly, two types of integrated circuits (IC) forming the responders must be manufactured. This disadvantageously results not only in increase in the designing, manufacturing and product cost, but also in complicated management of the products (integrated circuit, communication apparatus and the like) for proper use.

DISCLOSURE OF THE INVENTION

An object of the present invention is to provide a data communication apparatus (a responder) which can be used both in one-wave and two-wave modes.

The object of the present invention is achieved by a data communication apparatus for data communication with an interrogator including: a power generating circuit generating power by a signal having a first frequency transmitted from the interrogator; and a modulating circuit modulating the signal having the first frequency in accordance with response information for an interrogation data when the signal having the first frequency transmitted from the interrogator has been modulated in accordance with the interrogation data, and modulating a signal having a second frequency in accordance with response information for an interrogation data obtained by demodulating the signal having the second frequency transmitted from the interrogator when the signal having the first frequency transmitted form the interrogator has not been modulated.

An advantage of the present invention is that one data communication apparatus (responder) enables communication both in the one-wave mode and two-wave mode, so that two types of data communication apparatuses are not necessary. In addition, since two types of integrated circuits forming the data communication apparatuses needs not be manufactured, reduction in the designing, manufacturing and product cost is achieved and management of the products (integrated circuits or communication apparatuses) for proper use is facilitated.

BRIEF DESCRIPTION OF THE DRAWINGS

FIG. 1 is a block diagram showing a structure of a high frequency tag according to a first embodiment of the present invention.

FIGS. 2A and 2B are diagrams showing waveforms of signals in the case of the two-wave mode.

FIG. 3 is a diagram showing a waveform of a signal in the case of the one-wave mode.

FIGS. 4A and 4B are timing charts shown in conjunction with operations of an interrogator and responder.

FIG. 5 is a diagram showing a waveform of a signal which is transmitted back to the interrogator from the high frequency tag.

BEST MODES FOR CARRYING OUT THE INVENTION

Figure 6:
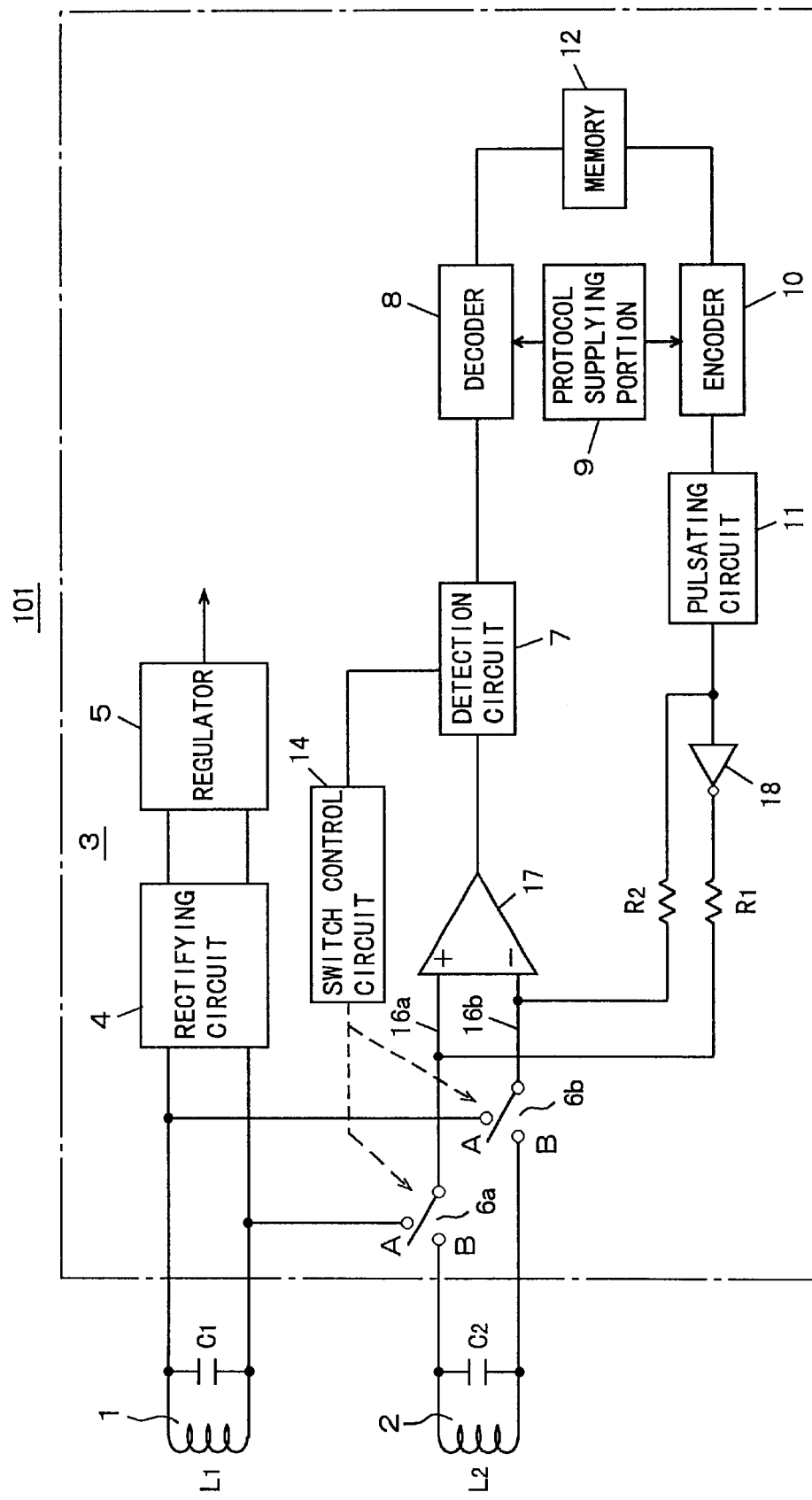
FIG. 6 is a block diagram showing a structure of a high frequency tag according to a second embodiment of the present invention.

Embodiments of the present invention will now be described in detail with reference to the drawings. It is noted that the same reference numerals in the drawings indicate the same or corresponding portions.

FIRST EMBODIMENT

FIG. 1 is a block diagram showing an overall structure of a high frequency tag (a responder) according to a first embodiment of the present invention. As shown in FIG. 1, a high frequency tag 100 receives and transmits a signal from and to an interrogator 200 having an antenna 201 by a radio wave, and is provided with a first tuning circuit 1, a second tuning circuit 2 and an integrated circuit 110.

Here, first tuning circuit 1 includes a tuning coil L1 tuning approximately to 13.56 MHz and functioning as a reception antenna, and a tuning condenser C1 connected between both ends of tuning coil L1. A signal having a tuned frequency $f_1$ which is determined by tuning coil L1 and tuning condenser C1 is output from tuning coil L1.

Second tuning circuit 2 includes a tuning coil L2 tuning approximately to 3.39 MHz and functioning as a transmission/reception antenna, and a tuning condenser C2 connected between both ends of tuning coil L2. A signal having a tuned frequency $f_2$ which is determined by tuning coil L2 and tuning condenser C2 is output from tuning coil L2.

Further, integrated circuit 110 includes: a power supply circuit 3 connected to first tuning circuit 1 and generating power by the received high frequency signal; an information processing circuit 15; and a switching circuit 6 which is formed of a semiconductor switch and connected to a connecting point A in the initial state. Power supply circuit 3 includes a rectifying circuit 4 rectifying a tuned signal and a regulator 5 connected to rectifying circuit 4 and stabilizing a voltage rectified by and transmitted from rectifying circuit 4. It is noted that an output voltage of regulator 5 is supplied for each circuit in integrated circuit 110.

Figure 8A:
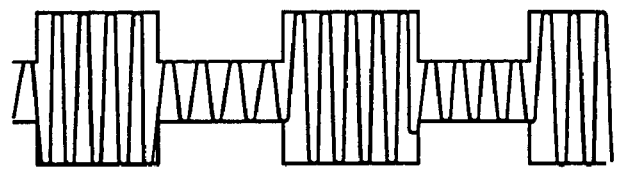
FIGS. 8A and 8B are diagrams showing waveforms of signals input to or output from a detection circuit.
Figure 8B:

In addition, information processing circuit 15 includes: a detection circuit 7 connected to switching circuit 6 and detecting (demodulating) a modulated signal (a carrier) shown in FIG. 8A which is supplied from first tuning circuit 1 or second tuning circuit 2 for obtaining an information signal shown in FIG. 8B; and a decoder 8 connected to detection circuit 7. It is noted that the information signal shown in FIG. 8B is a digital signal, which is shaped to be a pulse signal having a waveform in a rectangular shape by a waveform shaping circuit (not shown) and then supplied for decoder 8.

Thereafter, decoder 8 decodes the above mentioned pulse signal in accordance with a prescribed protocol and outputs a digital data. It is noted that, generally, decoder 8 also performs serial-parallel conversion.

Information processing circuit 15 includes a memory 12 connected to decoder 8. Memory 12 is accessed by an address designation data output from decoder 8 and, a data stored at the designated address is read.

Information processing circuit 15 includes: an encoder 10 connected to memory 12; a protocol supplying portion 9 connected to decoder 8 and encoder 10; a pulsating circuit 11 connected to encoder 10; and an N channel MOS transistor 13 having its gate connected to pulsating circuit 11. Here, an encoding process is performed for the data which is read from memory 12 by encoder 10 in accordance with the protocol supplied from protocol supplying portion 9. In most cases, encoder 10 also performs parallel-serial conversion. The data which has been converted to serial data is in turn converted to a pulse train signal by pulsating circuit 11 and supplied for the gate of N channel MOS transistor 13.

Information processing circuit 15 includes a signal transmission line 16 connecting switching circuit 6 and detection circuit 7, and the N channel MOS transistor has its source connected to a ground node and its drain connected to signal transmission line path 16. In the periods in which N channel MOS transistor 13 is turned on and off, an impedance of first tuning circuit 1 or second tuning circuit 2 which is connected to signal transmission line 16 via switching circuit 6 is different.

Information processing circuit 15 includes a switch control circuit 14 connected to detection circuit 7 and detecting a mode of the received radio wave for selectively connecting a connecting point A or connecting point B by switching circuit 6. Switch control circuit 14 checks an output signal from first tuning circuit 1 and, if the output signal is related to the one-wave mode, connects connecting point A by switching circuit 6, but connects connecting point B by switching circuit 6 if the output signal is related to the two-wave mode. It is noted that connecting point A is connected by switching circuit 6 in the initial state and the output signal from first tuning circuit 1 is detected by detection circuit 7.

Figure 7:
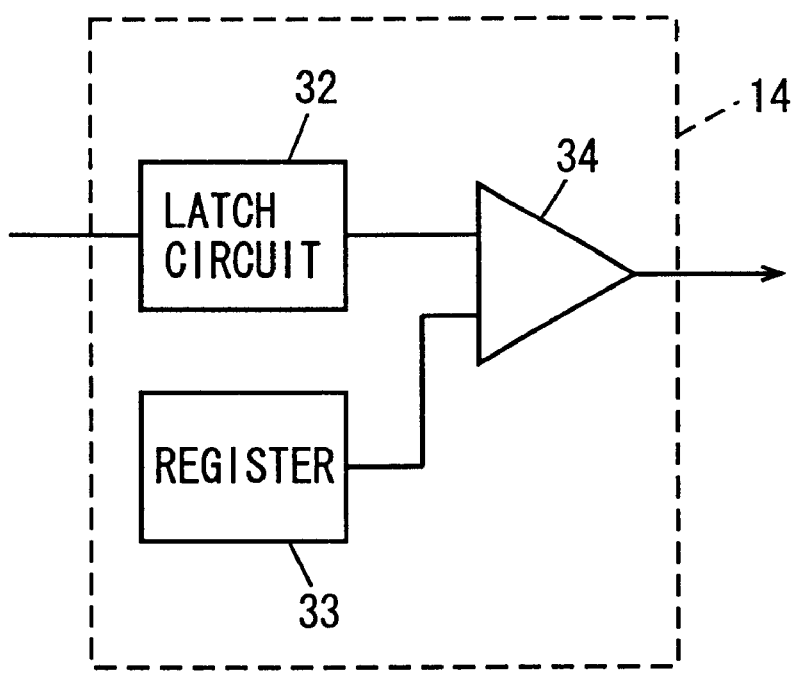
FIG. 7 is a block diagram showing a structure of a switch control circuit detecting the mode related to the received radio wave.

Switch control circuit 14 includes a latch circuit 32, a register 33 and a comparator 34 connected to latch circuit 32 and register 33 as shown for example in FIG. 7. Here, latch circuit 32 latches a prescribed number of bits of the output signal from detection circuit 7, and register 33 stores a reference data for the one-wave mode (or two-wave mode). Comparator 34 compares an output signal from latch circuit 32 and an output signal from register 33 and, continues to output "1" if they match, but "0" if they mismatch. For example, if register 33 stores the data related to the one-wave mode, connecting point A is connected by switching circuit 6 when "1" is output, whereas connecting point B is connected by switching circuit 6 when "0" is output.

Next, an operation of high frequency tag 100 according to the first embodiment will be described.

Initially, when interrogator 200 has the two-wave mode, a first signal of a carrier which has not been modulated and which has a frequency $f_1$ shown in FIG. 2A and a second signal which is an arbitrary information signal such as "10101" shown in FIG. 2B and a carrier having an amplitude-modulated frequency $f_2$ are transmitted from antenna 201.

At the time, in high frequency tag 100, first tuning circuit 1 receives the first signal and second tuning circuit 2 receives the second signal. The received first signal is converted to power by power supply circuit 3, so that the power is supplied for every circuit in high frequency tag 100 including detection circuit 7, switch control circuit 14 and the like as operating power.

On the other hand, the first signal received by first tuning circuit 1 is supplied for detection circuit 7 via switching circuit 6 as connecting point A is connected by switching circuit 6 in the initial state, and the two-wave mode of interrogator 200 is detected by switch control circuit 14. As a result, connecting point B is connected by switching circuit 6, and the second signal received by second tuning circuit 2 is supplied for information processing circuit 15 by signal transmission line 16. Thereafter, information "10101" from the second signal shown in FIG. 2B is decoded by decoder 8, and response information "10110" for the information shown in FIG. 5 is pulsated by pulsating circuit 11. N channel MOS transistor 13 is turned on/off in accordance with the pulse train signal which has been pulsated by pulsating circuit 11, and the impedance of second tuning circuit 2 is changed.

For the second signal transmitted from interrogator 200, transmission periods T0–T1, T2–T3 and reception period T1–T2 are alternately arranged as shown in FIG. 4A for interrogator 200. Although a modulated signal such as the one shown in FIG. 2B is transmitted in transmission periods T0–T1, T2–T3, for example, a signal of a carrier at frequency $f_2$, which has not been modulated, is transmitted in reception period T1–T2. In reception period T1–T2, however, since the impedance of second tuning circuit 2 which is to be a load of interrogator 200 is changed in accordance with on/off of N channel MOS transistor 13 by the radio wave, a signal which has been amplitude-modulated in accordance with "10110" shown in FIG. 5 is recognized by detection of the level of the signal transmitted from interrogator 200. It is noted that this is equivalent to transmission of the response information from high frequency tag 100 to interrogator 200 by the radio wave. More specifically, the response information from high frequency tag 100 is transmitted by the radio wave from interrogator 200 without transmitting the radio wave from high frequency tag 100.

FIG. 4B is a timing chart showing the operation of high frequency tag 100. As shown in FIG. 4B, the operation of high frequency tag 100 is in a reverse relation with respect to the operation of interrogator 200 shown in FIG. 4A.

It is noted that a mode of high frequency tag 100 is switched between transmission and reception modes by a command, which is transmitted from interrogator 200 as a part of information.

When interrogator 200 has the one-wave mode, only a signal of a carrier having a frequency f0 which has been amplitude-modulated for example by the information as shown in FIG. 3 is supplied for high frequency tag 100. Here, frequency $f_0$ is the same as or close to frequency $f_1$ of a signal including a carrier for the two-wave mode. Thus, the signal shown in FIG. 3 is received by first tuning circuit 1. At the time, no signal is received by second tuning circuit 2, so that an output therefrom would be 0.

The signal received by first tuning circuit 1 is converted to power by power supply circuit 3. Unlike the case of the two-wave mode, although there is a slight variation in an output voltage level of rectifying circuit 4 for rectifying the modulated signal, the voltage is kept at a prescribed level by regulator 5.

The received signal is also detected by detection circuit 7 through switching circuit 6, and connecting point A is still connected by switching circuit 6 as the one-wave mode is detected by switch control circuit 14.

It is noted that N channel MOS transistor 13 is turned on/off by the pulse train signal output from pulsating circuit 11, and the impedance of first tuning circuit 1 is changed. In addition, transmission of the response information to interrogator 200 is performed by the radio wave received by first tuning circuit 1.

SECOND EMBODIMENT

FIG. 6 is a block diagram showing an overall structure of a high frequency tag (a responder) according to a second embodiment of the present invention. As shown in FIG. 6, the high frequency tag has a structure which is similar to that of the high frequency tag according to the first embodiment, except that one end of second tuning circuit 2 is not connected to a ground node, signal transmission lines 16a and 16b are respectively connected through switching circuits 6a and 6b to both ends of second tuning circuit 2, and the high frequency tag is provided with a comparator 17 having input ends connected to signal transmission lines 16a and 16b, an inverter 18 and a resistance R1 which are connected in series between pulsating circuit 11 and signal transmission line 16a and a resistance R2 connected between pulsating circuit 11 and signal transmission line 16b, where switch control circuit 14 controls switching circuit 6a and switching circuit 6b.

More specifically, switch control circuit 14 makes switching circuits 6a and 6b connect connecting points on the same side. In other words, when connecting point A is connected by switching circuit 6a, for example, connecting point A is also connected by switching circuit 6b.

High frequency tag 101 having such structure also enables data communication with interrogator 200 both in the one-wave mode and two-wave mode as in the case of high frequency tag 100 according to the above described first embodiment.

What is claimed is:

1. A multiple mode capable data communication apparatus for data communication with an interrogator, said interrogator being adapted to operate in a one-wave mode operation in which a first signal of a first frequency modulated with interrogation data is transmitted, or in a two-wave mode operation in which the first signal of the first frequency is not modulated and a second signal of a second frequency modulated with the interrogation data is transmitted, said data communication apparatus comprising:

power generating means for generating power from the first signal transmitted from said interrogator;

demodulating means for demodulating the interrogation data of the first signal when the interrogator is in the one wave mode operation, and demodulating the interrogation data of the second signal when the interrogator is in the two wave mode operation;

switching means for switching the demodulating means between a one wave mode operation and a two wave mode operation; and modulating means for modulating response information for the interrogation data obtained by the demodulated first signal, to a signal of the first frequency when said interrogator is in the one-wave mode operation, and for modulating the response information for the interrogation data obtained by the demodulated second signal, to a signal of the second frequency when said interrogator is in the two-wave mode operation.

2. The data communication apparatus according to claim 1, wherein said modulating means includes:

first tuning means for transmitting and receiving said signal having the first frequency;

second tuning means for transmitting and receiving said signal having the second frequency, wherein the demodulating means demodulates a signal received by one of said first tuning means and said second tuning means and, wherein the switching means connects said demodulating means and one of said first tuning means and said second tuning means and connects said demodulating means and said first tuning means in an initial state; and switch controlling means connected to said demodulating means for controlling said switching means to connect said demodulating means and said first tuning means when said signal having the first frequency demodulated by said demodulating means has been modulated and to connect said demodulating means and said second tuning means when said signal has not been modulated.

3. The data communication apparatus according to claim 2, wherein said modulating means (15) further includes differential amplifying means (17) connected between said switching means (6a, 6b) and said demodulating means (7) for differentially inputting the signal received by said first tuning means (1) or said second tuning means (2).

* * * * *